June 4, 1940.  J. B. PAXTON  2,203,618
FISHING DEVICE
Filed June 10, 1939
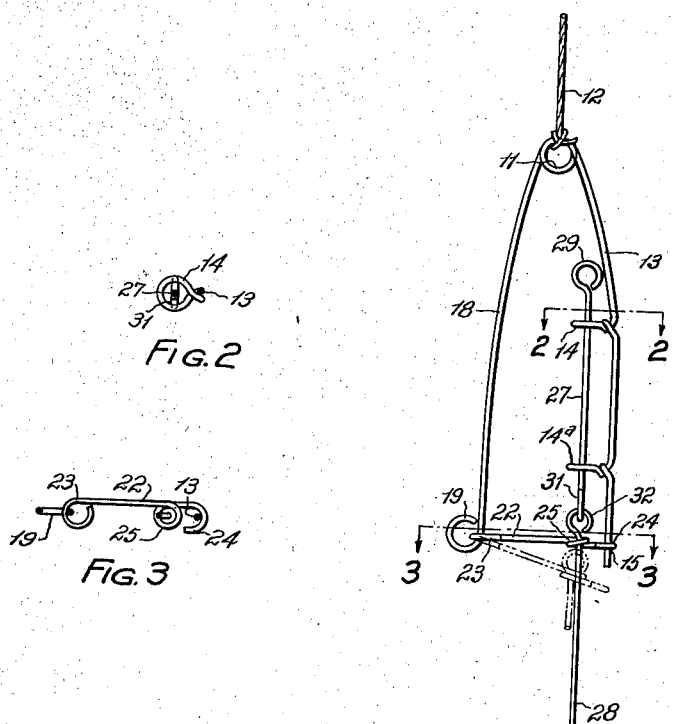
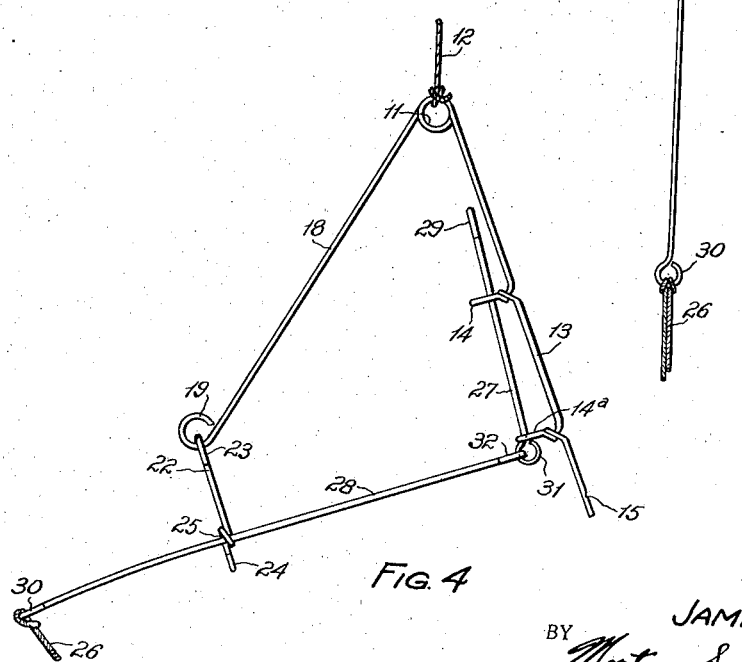
INVENTOR.
JAMES B. PAXTON
BY Morton S. Brockman
ATTORNEY.

Patented June 4, 1940

2,203,618

UNITED STATES PATENT OFFICE 2,203,618

FISHING DEVICE

James B. Paxton, Huron, Ohio, assignor of one-half to Joseph S. Malik, Cleveland, Ohio Application June 10, 1939, Serial No. 278,506

6 Claims. (Cl. 43—37)

This device relates to fishing and particularly to snares attached to conventional tackle which automatically sets a hook in the mouth of a fish.

The primary object of the invention is to provide a trap which produces a quick jerk on a hook while the hook is in the mouth of a fish.

Another object is to provide a device of the type described and mentioned which causes the hook to be pulled laterally as well as upwardly.

A further object is to construct such device of simple inexpensive materials, which are simple and easy to set for operation and which will be certain of action when the trigger is released.

These and other objects and features of the invention will become apparent from a study of the following description and claims together with the accompanying drawing in which like parts are designated by like reference characters and wherein:

Figure 1 is a view of the device when closed;

Figure 2 is a sectional view of a portion of the device taken along the lines 2—2 of the Figure 1;

Figure 3 is a sectional view of a portion of the device taken along the lines 3—3 of the Figure 1; and Figure 4 is a view of the device open and sprung.

Broadly described, this invention consists of a line member coupled with a hook member.

The line member is made of a length of spring wire folded or twisted at about its middle to form a coil spring 11, to which there is tied the line 12 that leads up through the water to the fish pole. Extending outward of the coil 11 are two arms herein referred to as primary arms and secondary arms.

The primary arm 13 is twisted so as to form two transverse loops 14 and 14a which are in line with and have their openings facing each other. The end of the primary arm 13 just below the loop 14a has a small notch or catch 15 which acts as a temporary holder for the trigger 22 hereinafter described.

The secondary arm 18 is about as long as the primary arm 13 and because of the spring 11 tends to move away from it. This secondary arm 18 is provided with a simple loop 19 at its end, to which loop 19 there is linked the trigger 22.

The trigger 22 is formed of a short length of wire, one end of which has a small loop 23 that loosely engages the loop 19 of the secondary arm 18. The opposite end of the trigger 22 has a small hook 24 which engages the catch 15 and when so engaged the two arms 13 and 18 are brought together under tension. The trigger member 22, somewhere near the hook 24 and at a point in line with and below the loops 14 and 14a, is provided with a small loop herein referred to as an eyelet 25.

The hook member consists of two lengths of wire 27 and 28 swivelly connected or linked together. The top portion 27 of the member is provided with a loop 29 slightly larger than the loop 14 of the primary arm and is not able to entirely pass through it. The bottom portion 28 is provided with a simple loop 30 to which is attached the line or snell 26 which leads to the fish hook and lure.

The two portions 27 and 28 are linked together with their respective loops 31 and 32. The loop 32 is a little larger than the eyelet 25 of the trigger member and when drawn downward trips the trigger 22 by disengaging the hook 24 from the primary arm and the catch 15.

The top portion 27 of the hook member rides freely through the two loops 14 and 14a and in line with the primary arm 13 for a limited distance. The bottom portion 28 of the hook member rides freely through the single eyelet 25 of the trigger 22.

The Figure 1 shows how the device is set for operation. The two arms 13 and 18 are brought together and are temporarily held in place under tension with the trigger 22. When the bottom portion 28 is drawn downward, the loop 32 pushes the trigger eyelet 25 before it until the primary arm 13 is disengaged. Upon such disengagement, the arms 13 and 18 spread apart suddenly. The secondary arm 18 and the trigger 32 coupled thereto jerk the hook member sidewise and upwards for a distance sufficient to set the hook then in the mouth of the fish.

It will now be clear that there is provided by this invention a fishing device which accomplishes the objects of the invention. While the invention has been described in a specific form and while certain general terms and specific language have been used, it is to be understood that the embodiment of the invention as described is suggestive only and is not to be considered in a limiting sense. It is to be further understood that there may be other forms or adaptations of the invention and those modifications are also considered to be within the broad scope of the invention as no limitations upon it are intended other than those imposed thereon by the scope of the appended claims.

I claim:

1. An angling device, comprising in combination: a line member having a primary arm, a secondary arm and a spring engaging an end of each of the said arms, the said spring tending to swing the arms apart, a hook member having a trip thereon and being linked to the said primary arm, and a trigger mechanism connected to the secondary arm, engageable with the said primary arm and releasable by the said trip.

2. An angling device, comprising in combination: a line member having a primary arm, a secondary arm and a spring engaging an end of each of the said arms; a trigger member having an eyelet therein, linked to the said secondary arm and engageable with the said primary arm; and a hook member having a first portion slidably engageable with the primary arm and a second portion engageable with the said eyelet in a manner whereby the said trigger member may be released to spring the said arms apart and simultaneously jerking the said second portion of the hook member upward and sideward.

3. An angling device, comprising in combination: a line member consisting of a primary arm, a secondary arm and a spring for opening the said arms, the said primary arm having a catch thereon; a trigger member linked to the secondary arm and having a hook engageable with the said catch for closing the said arms under tension; and a hook member consisting of a first portion slidably engageable with the primary arm and a second portion movable by the said secondary arm, the said hook member having a means for disengaging the hook from the catch thereby causing the secondary arm to jerk the said second portion.

4. An angling device, comprising in combination, a hook member, a primary arm having means thereon for slidably engaging the hook member and having a catch thereon, a secondary arm having means thereon for jerking the said hook member, a spring means connecting the said arms and tending to spread them apart, a trigger member connected to the said secondary arm and having a hook thereon engageable with the said catch, and a trip on the said hook member operating the said trigger member in a manner whereby the hook is disengaged from the catch causing the secondary arm to jerk the hook member.

5. An angling device, comprising in combination, a movable hook member consisting of a top portion and a bottom portion linked together, a primary arm having guide loops thereon for slidably engaging the hook member top portion, the said primary arm also having a trigger catch on a pendent end thereof, a secondary arm having a link on a pendent end thereof, a spring means connecting the said arms at their dependent ends and tending to spread them apart, and a trigger member having an eyelet therein for engaging the hook member bottom portion and a hook thereon for engaging the primary arm catch, the said trigger member being swivelly connected to the secondary arm link, closing the said arms under tension and being operable by the movement of the hook member in a manner whereby the hook member bottom portion may be suddenly jerked.

6. An angling device, comprising in combination, a movable hook member consisting of a top portion and a bottom portion connected together, the said hook member having a trip thereon, a primary arm having guide means thereon slidably engaging the hook member top portion, a movable secondary arm, a spring integral with the said arms tending to spread them apart, and a trigger member having an eyelet therein for slidably engaging the hook member bottom portion the said trigger member being swivelly connected to the said secondary arm, closing the said arms under tension and in a manner whereby the action of the hook member trip on the said trigger member causes the secondary arm to jerk the hook member bottom portion.

JAMES B. PAXTON.